(12) United States Patent
Schechter et al.

(10) Patent No.: US 7,380,250 B2
(45) Date of Patent: May 27, 2008

(54) METHOD AND SYSTEM FOR INTERACTING WITH DEVICES HAVING DIFFERENT CAPABILITIES

(75) Inventors: Greg D. Schechter, Seattle, WA (US); Shanku S. Niyogi, Bellevue, WA (US); David J. Kurlander, Seattle, WA (US); Kris N. Nye, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 09/934,122

(22) Filed: Aug. 20, 2001

(65) Prior Publication Data

US 2002/0133635 A1    Sep. 19, 2002

Related U.S. Application Data

(60) Provisional application No. 60/276,394, filed on Mar. 16, 2001.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 15/16 | (2006.01) |
| G06F 15/00 | (2006.01) |
| G06F 17/00 | (2006.01) |

(52) U.S. Cl. .................. 719/328; 709/246; 715/513; 715/517; 715/760

(58) Field of Classification Search .................. 707/6, 707/513; 709/246; 719/310, 328; 715/513, 715/517, 760
See application file for complete search history.

(56) References Cited

U.S. PATENT DOCUMENTS 3,937,925 A   2/1976   Boothroyd (Continued)

FOREIGN PATENT DOCUMENTS

EP    01 11 1670    12/2000

(Continued)

OTHER PUBLICATIONS

Davidson et al., "Schema for Object-Oriented XML 2.0", Jul. 1999, W3 Consortium, pp. 1-29.*

(Continued)

Primary Examiner—William Thomson
Assistant Examiner—Qing-Yuan Wu
(74) Attorney, Agent, or Firm—Merchant & Gould P.C.

(57) ABSTRACT

A method and system for interacting with devices having different capabilities is described. Intelligent server-side objects (referred to as adapters) are used to translate information and commands to and from various formats depending on the requirements and capabilities of the target device. Using an interface to the adapters, a software developer may create a form without knowing the exact details or features of the device upon which the form will be displayed. Adapters are logically grouped together in adapter sets wherein a set of adapters may be used to transform information to and from a set of devices with common capabilities. An adapter may inherit attributes and methods from another adapter in the same or another adapter set. An adapter set may inherit adapter associations, i.e., which server objects should be mapped to which adapters, from another adapter set. To make a new or existing device compatible with existing server applications, a device developer may relatively quickly create one or more adapters.

20 Claims, 8 Drawing Sheets

U.S. PATENT DOCUMENTS

| | | |
|---|---|---|
| 3,956,615 A | 5/1976 | Anderson et al. |
| 4,186,871 A | 2/1980 | Anderson et al. |
| 4,807,154 A | 2/1989 | Scully et al. |
| 4,847,785 A | 7/1989 | Stephens |
| 4,949,300 A | 8/1990 | Christenson et al. |
| 4,979,148 A | 12/1990 | Bush et al. |
| 5,093,778 A | 3/1992 | Favor |
| 5,299,315 A | 3/1994 | Chin et al. |
| 5,349,657 A | 9/1994 | Lee |
| 5,388,156 A | 2/1995 | Blackledge, Jr. et al. |
| 5,434,992 A | 7/1995 | Mattson |
| 5,465,332 A | 11/1995 | Deloye et al. |
| 5,471,318 A | 11/1995 | Ahuja et al. |
| 5,517,655 A | 5/1996 | Collins et al. |
| 5,548,340 A | 8/1996 | Bertram |
| 5,550,560 A | 8/1996 | Kanada et al. |
| 5,604,908 A | 2/1997 | Mortson |
| 5,608,890 A | 3/1997 | Berger et al. |
| 5,638,176 A | 6/1997 | Hobbs et al. |
| 5,640,449 A | 6/1997 | Worley et al. |
| 5,649,131 A | 7/1997 | Ackerman et al. .......... 715/744 |
| 5,664,228 A | 9/1997 | Mital |
| 5,675,520 A | 10/1997 | Pitt, III et al. |
| 5,706,505 A | 1/1998 | Fraley et al. |
| 5,727,159 A | 3/1998 | Kikinis |
| 5,732,256 A | 3/1998 | Smith |
| 5,732,267 A | 3/1998 | Smith |
| 5,745,103 A | 4/1998 | Smith |
| 5,748,890 A | 5/1998 | Goldberg et al. |
| 5,754,774 A | 5/1998 | Bittinger et al. |
| 5,764,235 A | 6/1998 | Hunt et al. |
| 5,764,873 A | 6/1998 | Magid et al. |
| 5,774,670 A | 6/1998 | Montulli |
| 5,793,982 A | 8/1998 | Shrader et al. |
| 5,802,600 A | 9/1998 | Smith et al. |
| 5,812,996 A | 9/1998 | Rubin et al. |
| 5,835,724 A | 11/1998 | Smith |
| 5,855,020 A | 12/1998 | Kirsch |
| 5,878,141 A | 3/1999 | Daly et al. |
| 5,878,282 A | 3/1999 | Mital |
| 5,892,937 A | 4/1999 | Caccavale |
| 5,897,622 A | 4/1999 | Blinn |
| 5,897,644 A | 4/1999 | Nielsen |
| 5,911,068 A | 6/1999 | Zimmerman et al. |
| 5,911,145 A | 6/1999 | Arora et al. |
| 5,918,007 A | 6/1999 | Blackledge, Jr. et al. |
| 5,935,207 A | 8/1999 | Logue et al. |
| 5,940,075 A | 8/1999 | Mutschler, III |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,974,430 A | 10/1999 | Mutschler, III et al. |
| 5,983,227 A | 11/1999 | Nazem et al. |
| 5,991,802 A | 11/1999 | Allard et al. |
| 5,995,753 A | 11/1999 | Walker ....................... 717/108 |
| 6,006,230 A | 12/1999 | Ludwug et al. |
| 6,014,637 A | 1/2000 | Fell et al. |
| 6,014,666 A | 1/2000 | Helland et al. |
| 6,023,714 A * | 2/2000 | Hill et al. ................... 715/513 |
| 6,032,207 A | 2/2000 | Wilson |
| 6,038,551 A | 3/2000 | Barlow et al. |
| 6,059,913 A | 5/2000 | Martin et al. |
| 6,067,578 A | 5/2000 | Zimmerman et al. |
| 6,072,664 A | 6/2000 | Aoyagi et al. |
| 6,076,108 A | 6/2000 | Courts et al. |
| 6,101,607 A | 8/2000 | Bachand et al. |
| 6,108,717 A | 8/2000 | Kimura |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. .......... 709/219 |
| 6,121,968 A | 9/2000 | Arcuri et al. |
| 6,122,637 A | 9/2000 | Yohe et al. |
| 6,128,623 A | 10/2000 | Mattis et al. |
| 6,138,150 A | 10/2000 | Nichols et al. |
| 6,138,171 A | 10/2000 | Walker ....................... 719/318 |
| 6,151,624 A | 11/2000 | Teare et al. |
| 6,167,438 A | 12/2000 | Yates et al. |
| 6,167,441 A | 12/2000 | Himmel ....................... 709/217 |
| 6,167,524 A | 12/2000 | Goodnow et al. |
| 6,173,316 B1 | 1/2001 | De Boor et al. ............. 709/218 |
| 6,178,461 B1 | 1/2001 | Chan |
| 6,185,608 B1 | 2/2001 | Hon et al. |
| 6,185,625 B1 | 2/2001 | Tso et al. |
| 6,202,199 B1 | 3/2001 | Wygodny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,230,160 B1 | 5/2001 | Chan |
| 6,230,313 B1 | 5/2001 | Callahan, II et al. |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,279,151 B1 | 8/2001 | Breslau et al. |
| 6,286,133 B1 | 9/2001 | Hopkins |
| 6,297,819 B1 | 10/2001 | Furst |
| 6,300,947 B1 | 10/2001 | Kanevsky |
| 6,311,215 B1 | 10/2001 | Bakshi et al. |
| 6,326,957 B1 | 12/2001 | Nathan et al. |
| 6,334,126 B1 | 12/2001 | Nagatomo et al. |
| 6,334,157 B1 | 12/2001 | Oppermann et al. |
| 6,343,148 B2 | 1/2002 | Nagy |
| 6,345,279 B1 | 2/2002 | Li et al. |
| 6,351,767 B1 | 2/2002 | Batchelder et al. |
| 6,353,447 B1 | 3/2002 | Truluck et al. |
| 6,354,477 B1 | 3/2002 | Trummer |
| 6,363,352 B1 | 3/2002 | Dailey et al. |
| 6,370,561 B1 | 4/2002 | Allard et al. |
| 6,373,841 B1 | 4/2002 | Goh et al. |
| 6,397,253 B1 | 5/2002 | Quinlan et al. |
| 6,401,099 B1 | 6/2002 | Koppulu et al. |
| 6,401,132 B1 | 6/2002 | Bellwood et al. ........... 709/246 |
| 6,405,241 B2 | 6/2002 | Gosling |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |
| 6,426,761 B1 | 7/2002 | Kanevsky et al. |
| 6,430,575 B1 | 8/2002 | Dourish et al. |
| 6,438,576 B1 | 8/2002 | Huang et al. ................ 709/202 |
| 6,457,030 B1 | 9/2002 | Adams et al. |
| 6,460,071 B1 | 10/2002 | Hoffman |
| 6,460,141 B1 | 10/2002 | Olden |
| 6,463,442 B1 | 10/2002 | Bent et al. |
| 6,466,203 B2 | 10/2002 | Van Ee |
| 6,470,381 B2 | 10/2002 | De Boor et al. ............. 709/217 |
| 6,473,609 B1 | 10/2002 | Schwartz et al. ........... 455/406 |
| 6,480,894 B1 | 11/2002 | Courts et al. |
| 6,487,665 B1 | 11/2002 | Andrews et al. |
| 6,496,692 B1 | 12/2002 | Shanahan |
| 6,505,238 B1 | 1/2003 | Tran |
| 6,509,913 B2 | 1/2003 | Martin et al. ................ 715/513 |
| 6,535,896 B2 | 3/2003 | Britton et al. |
| 6,539,421 B1 | 3/2003 | Appelman et al. |
| 6,539,501 B1 | 3/2003 | Edwards |
| 6,542,908 B1 | 4/2003 | Ims |
| 6,542,967 B1 | 4/2003 | Major |
| 6,546,473 B2 | 4/2003 | Cherkasova et al. |
| 6,546,516 B1 | 4/2003 | Wright et al. |

| | | |
|---|---|---|
| 6,556,217 B1 | 4/2003 | Makipaa et al. ............ 345/667 |
| 6,557,038 B1 | 4/2003 | Becker et al. |
| 6,560,598 B2 | 5/2003 | Delo et al. |
| 6,560,618 B1 | 5/2003 | Ims |
| 6,560,639 B1 | 5/2003 | Dan et al. |
| 6,563,517 B1 | 5/2003 | Bhagwat et al. |
| 6,563,913 B1 | 5/2003 | Kaghazian |
| 6,564,251 B2 | 5/2003 | Katariya et al. |
| 6,591,272 B1 | 7/2003 | Williams |
| 6,593,944 B1 | 7/2003 | Nicolas et al. |
| 6,606,418 B2 | 8/2003 | Mitchell et al. |
| 6,610,105 B1 | 8/2003 | Martin et al. ............... 709/246 |
| 6,622,168 B1 | 9/2003 | Datta |
| 6,633,416 B1 | 10/2003 | Benson |
| 6,643,712 B1 | 11/2003 | Shaw et al. |
| 6,678,518 B2 | 1/2004 | Eerola |
| 6,687,735 B1 | 2/2004 | Logston et al. |
| 6,697,825 B1 | 2/2004 | Underwood et al. |
| 6,704,024 B2 | 3/2004 | Robotham et al. |
| 6,704,728 B1 | 3/2004 | Chang et al. .................. 707/5 |
| 6,714,794 B1 | 3/2004 | O'Carroll |
| 6,725,219 B2 | 4/2004 | Nelson et al. |
| 6,728,421 B2 | 4/2004 | Kokemohr |
| 6,732,364 B1 | 5/2004 | Bhaskaran et al. |
| 6,738,968 B1 | 5/2004 | Bosworth et al. |
| 6,757,708 B1 | 6/2004 | Craig et al. |
| 6,757,899 B2 | 6/2004 | Zhdankin et al. |
| 6,757,900 B1 | 6/2004 | Burd et al. |
| 6,772,408 B1 | 8/2004 | Velonis et al. |
| 6,782,403 B1 | 8/2004 | Kino et al. |
| 6,789,105 B2 | 9/2004 | Ludwig et al. |
| 6,792,575 B1 | 9/2004 | Samaniego et al. |
| 6,792,605 B1 | 9/2004 | Roberts et al. |
| 6,792,607 B1 | 9/2004 | Burd et al. |
| 6,826,597 B1 | 11/2004 | Lonnroth et al. ........... 709/207 |
| 6,832,263 B2 | 12/2004 | Polizzi et al. |
| 6,834,297 B1* | 12/2004 | Peiffer et al. ............... 709/219 |
| 6,836,883 B1 | 12/2004 | Abrams et al. |
| 6,847,333 B2 | 1/2005 | Bokhour |
| 6,886,013 B1 | 4/2005 | Beranek ...................... 707/10 |
| 6,892,226 B1 | 5/2005 | Tso et al. |
| 6,901,437 B1 | 5/2005 | Li |
| 6,904,600 B1 | 6/2005 | James et al. |
| 6,915,307 B1 | 7/2005 | Mattis et al. |
| 6,915,454 B1 | 7/2005 | Moore et al. |
| 6,918,107 B2 | 7/2005 | Lucas et al. |
| 6,920,480 B2 | 7/2005 | Mitchell et al. |
| 6,922,827 B2 | 7/2005 | Vasilik et al. |
| 6,928,488 B1 | 8/2005 | De Jong et al. |
| 6,944,797 B1 | 9/2005 | Guthrie et al. |
| 6,948,174 B2 | 9/2005 | Chiang et al. |
| 6,950,875 B1 | 9/2005 | Slaughter et al. |
| 6,954,751 B2 | 10/2005 | Christfort et al. |
| 6,954,854 B1 | 10/2005 | Miura et al. |
| 6,961,750 B1 | 11/2005 | Burd et al. .................. 709/203 |
| 6,961,754 B2 | 11/2005 | Christopoulos et al. |
| 6,961,776 B1 | 11/2005 | Buckingham et al. |
| 6,964,009 B2 | 11/2005 | Samaniego et al. |
| 6,990,653 B1 | 1/2006 | Burd et al. .................. 717/108 |
| 7,013,340 B1 | 3/2006 | Burd et al. |
| 7,016,963 B1 | 3/2006 | Judd et al. |
| 7,076,786 B2 | 7/2006 | Burd et al. |
| 7,099,870 B2 | 8/2006 | Hsu et al. |
| 7,117,504 B2 | 10/2006 | Smith et al. |
| 7,159,007 B2 | 1/2007 | Stawikowski |
| 7,162,723 B2 | 1/2007 | Guthrie et al. |
| 7,171,443 B2 | 1/2007 | Tiemann et al. |
| 7,171,454 B2 | 1/2007 | Nguyen |
| 7,181,731 B2 | 2/2007 | Pace et al. |
| 7,188,112 B1 | 3/2007 | Lindquist et al. |
| 7,188,155 B2 | 3/2007 | Flurry et al. |
| 7,216,294 B2 | 5/2007 | Gibbs et al. |
| 2001/0013070 A1 | 8/2001 | Sasuki |
| 2001/0027474 A1 | 10/2001 | Nachman et al. |
| 2001/0037404 A1 | 11/2001 | Hafsteinsson et al. ...... 709/203 |
| 2001/0047385 A1 | 11/2001 | Tuatani |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0056085 A1 | 5/2002 | Fahraeus |
| 2002/0062396 A1* | 5/2002 | Kakei et al. ................. 709/246 |
| 2002/0073163 A1* | 6/2002 | Churchill et al. ........... 709/214 |
| 2002/0078101 A1 | 6/2002 | Chang et al. |
| 2002/0078144 A1 | 6/2002 | Lamkin et al. |
| 2002/0083171 A1 | 6/2002 | Hoogenboom et al. |
| 2002/0095445 A1 | 7/2002 | alSafadi et al. |
| 2002/0107891 A1* | 8/2002 | Leamon et al. .............. 707/513 |
| 2002/0108102 A1 | 8/2002 | Muhlestein et al. |
| 2002/0116534 A1 | 8/2002 | Teeple |
| 2002/0120677 A1 | 8/2002 | Goward et al. |
| 2002/0120753 A1 | 8/2002 | Levanon et al. |
| 2002/0129016 A1* | 9/2002 | Christfort et al. ............... 707/6 |
| 2002/0138831 A1 | 9/2002 | Hosea et al. |
| 2002/0152244 A1 | 10/2002 | Dean et al. |
| 2002/0161928 A1* | 10/2002 | Ndili .......................... 709/246 |
| 2002/0161938 A1 | 10/2002 | Bonomo et al. |
| 2002/0188890 A1 | 12/2002 | Shupps et al. |
| 2002/0194227 A1 | 12/2002 | Day et al. |
| 2003/0004998 A1 | 1/2003 | Datta |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Guthrie et al. |
| 2003/0025728 A1 | 2/2003 | Ebbo et al. |
| 2003/0028565 A1 | 2/2003 | Landsman et al. |
| 2003/0028892 A1 | 2/2003 | Gewickey et al. |
| 2003/0066056 A1 | 4/2003 | Petersen et al. |
| 2003/0074634 A1 | 4/2003 | Emmelmann |
| 2003/0097639 A1 | 5/2003 | Niyogi et al. |
| 2003/0110234 A1 | 6/2003 | Egli et al. |
| 2003/0187952 A1 | 10/2003 | Young et al. |
| 2003/0204622 A1 | 10/2003 | Blizniak et al. |
| 2003/0233477 A1 | 12/2003 | Ballinger et al. |
| 2004/0003112 A1 | 1/2004 | Alles et al. |
| 2004/0003117 A1 | 1/2004 | McCoy et al. |
| 2004/0003139 A1 | 1/2004 | Cottrille et al. |
| 2004/0003248 A1 | 1/2004 | Arkhipov |
| 2004/0012627 A1 | 1/2004 | Zakharis et al. |
| 2004/0015879 A1 | 1/2004 | Pauw et al. |
| 2004/0030740 A1 | 2/2004 | Stelting |
| 2004/0073873 A1 | 4/2004 | Croney et al. |
| 2004/0172484 A1* | 9/2004 | Hafsteinsson et al. ...... 709/246 |
| 2004/0218045 A1 | 11/2004 | Bodnar et al. |
| 2004/0230958 A1 | 11/2004 | Alaluf |
| 2005/0091230 A1 | 4/2005 | Ebbo et al. |
| 2005/0108633 A1* | 5/2005 | Sahota et al. ................ 715/513 |
| 2005/0108634 A1* | 5/2005 | Sahota et al. ................ 715/513 |
| 2005/0138560 A1 | 6/2005 | Lee et al. |
| 2005/0171967 A1 | 8/2005 | Yuknewicz |
| 2005/0193097 A1 | 9/2005 | Guthrie et al. |
| 2005/0229186 A1 | 10/2005 | Mitchell et al. |
| 2005/0251380 A1 | 11/2005 | Calvert et al. |
| 2005/0256834 A1 | 11/2005 | Millington et al. |
| 2005/0256924 A1 | 11/2005 | Chory et al. |
| 2005/0256933 A1 | 11/2005 | Millington et al. |
| 2005/0257138 A1 | 11/2005 | Chory et al |
| 2005/0268292 A1 | 12/2005 | Ebbo et al. |
| 2005/0278351 A1 | 12/2005 | Niyogi et al. |
| 2006/0004910 A1 | 1/2006 | Burd et al. |
| 2006/0020883 A1 | 1/2006 | Kothari et al. |
| 2006/0112336 A1 | 5/2006 | Gewickey et al. |
| 2006/0130038 A1 | 6/2006 | Claussen et al. |
| 2007/0005795 A1 | 1/2007 | Gonzalez |

| | | |
|---|---|---|
| 2007/0033533 A1 | 2/2007 | Sull |
| 2007/0174845 A1 | 7/2007 | Guthrie et al. |

FOREIGN PATENT DOCUMENTS

| | | |
|---|---|---|
| EP | 1156415 | 11/2001 |
| EP | 1156415 A2 | 11/2001 |
| EP | 1156427 | 11/2001 |
| EP | 1156428 | 11/2001 |
| EP | 1156429 | 11/2001 |
| EP | 1164473 | 12/2001 |
| GB | 2339374 A | 1/2000 |
| JP | 11-98134 | 4/1999 |
| JP | 2002-24079 | 1/2002 |
| JP | 2002-41299 | 2/2002 |
| JP | 2002-49484 | 2/2002 |
| JP | 2002-49485 | 2/2002 |
| WO | WO98/21651 | 5/1998 |
| WO | WO 98/21651 | 5/1998 |
| WO | WO 98/44695 | 10/1998 |
| WO | WO98/44695 | 10/1998 |
| WO | WO 99/34288 | 7/1999 |
| WO | WO99/34288 A | 7/1999 |
| WO | 01/27783 A | 4/2001 |
| WO | WO 01/27783 | 4/2001 |
| WO | 01/75667 A | 10/2001 |
| WO | WO 01/75667 | 10/2001 |
| WO | 02/21343 | 3/2002 |
| WO | WO 02/21343 | 3/2002 |

OTHER PUBLICATIONS

Stewart, "The Documents as Application: Issues and Implications", *Proceedings of the XML Europe '99 Conference*, Granada, Spain, Apr. 26-30, 1999, pp. 575-599.
"Bluestone Software Lays Foundation for Internet Operating Environment with Total-E-Server; Union of J2ee's Jsp. 1.1, Servlets 2.2, and Ejb 1.1 Technologies with Xml and Bluestone's Legendary Performance Creates Unparalleled E-Business Infrastructure", *ScreamingMedia, Business Wire*, San Francisco, CA, Jun. 5, 2000.
"AlterEgo Networks introduces First Mobile Web Server For Enterprises, Telcos and Providers", *Newswire-PR Newswire*, Redwood City, CA, Nov. 14, 2000.
European Search Report 01111678.7-2201.
European Search Report 01111680.3-2201.
European Search Report 01111681.1-2201.
European Search Report 01111682.9-2201.
Anderson, Richard; Homer, Alex; Howard, Rob; Sussman, Dave; "A Preview of Active Server Pages+"; Copyright 2000, Wrox Press, pp. 1-73.
Developing ASP-Based Applications: Microsoft 1996, 5 pages.
Chapter 3, "Mechanics of Developing JavaScript Applications"; Server-Side Javascript Guide; Online! 1999; pp. 51-108 www.developer.netscape.com/docs/mauals/ssjs/1_4/ssjs.pdf.
Chapter 6, "Session Mangement Service"; Server Side Javascript Guide; Online! 1999 pp. 125-166 www.developer.netscape.com/docs/manuals/ssjs/1_4/ssjs.pdf.
"ColdFusion: Web Application Server"; Allair Corp; www.allair.com; 1995-1999; 28 pages.
Custer, Helen; "Inside Windows NT"; Microsoft Press 1993; pp. 74-81.
Davulcu, Hasan; Freire, Juliana; Kifer, Michael; Ramakrishnan, I.V.; "A Layered Architecture for Querying Dynamic Web Content"; ACM 1999; pp. 491-502.
Dobson, Rick; "Data Binding in Dynamic HTML"; DBMS Mar. 1998 pp. 47-52.
Duan, Nick N.; "Distributed Database Access in a Corporate Environment Using Java" Bell Atlantic Corporation; 1996; 8 pages.
Esposito, Dino; "Heaven Sent"; Developer Network Journal Issue 23 Mar./Apr. 2001 pp. 18-24.
Franklin, Keith; "Supercharge Data Binding"; Visual Basic Programmer's Journal, Mar. 2000; 7 pages.
Frost, Jim; "Windows NT Security"; May 4, 1995; 7 pages; http://world.std.com/~jimf/papers/nt-security/nt-security.html.

"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Holmes, John W.; e-Mail response to question regarding GET/POST.HTTP request, extracted from Google's News groups, php.general, Nov. 11, 2002.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May) 1999, pp. 109-111.
"HTML Encyclopaedia"; scit.wlv.ac.uk/encyc/form.html; 1995-1998 2 pages.
Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.
Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.
Marshall, James; "HTTP Made Really Easy: A Practical Guide to Writing Clients and Servers"; Aug. 15, 1997; 14 pages.
"A Brief History of Hypertext" Microsoft Corporation, 1996, 1 page.
Nadamoto, Akiyo; Kondo, Hiroyuki; Tanaka, Katsumi; "WebCarousel: Restructuring Web Search Results for Passive Viewing in Mobile Environments" IEEE 2001 p. 164-165.
"OOP Launches Hammock at JavaOne" oop.com/pr2000_06_08.jsp?gui=Plain Jun. 8, 2000, 1 page.
Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.
Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.
Shapiro, Marc; "A Binding Protocol for Distributed Shared Objects" Presented at 14th International Conference on Distributed Comp. Sys.; Jun. 21-24, 1994; 17 pages.
Shi, Weisong; Collins, Eli; Karamcheti, Vijay; "Modeling Object Characteristics of Dynamic Web Content"; Proceedings of the IEEE Global Internet Conference, Nov. 2002, 5pgs.
Solomon, David A. "Inside Windows NT, Second Edition"; Microsoft Press 1998; pp. 310-319.
Wu, Dapeng; Hou, Yiwci Thomas; Zhang, Ya-Qin; "Scalable Video Transport over Wireless IP Networks"; IEEE 2000; pp. 1185-1191.
"Best Practices for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
"Alterego Networks Introduces First Mobile Web Server for Enterprises, Telcos and Providers"; Redwood City, CA; Nov. 14, 2000; 3 pages.
"Bluestone Software Layers Foundation for Internet Operating Environment with Total-E-Server . . . " Screaming Media, Business Wire; Jun. 5, 2000; 3 pages.
"HTML Encyclopaedia"; http://www.scit.wlv.ac.uk/encyc/form.html; 2 pages.
Dowd, Tyson et al., "Compiling Mercury to the .NET Common Language Runtime," Electronic Notes in Theoretical Computer Sciences 59 No. 1 (Netherlands) (2001), pp. 1-16.
Hannay, Phillip et al., "MSIL For the .NET Framework: The Next Battleground?", Virus Bulletin Conference, Sep. 2001, pp. 173-196.
Langheinrich, M., et al., "Unintrusive customization techniques for Web advertising," Computer Networks, vol. 31, No. 11-16. May 17, 1999, pp. 1259-1272.

Lee. C.-H., et al., "Web personalization expert with combining collaborative filtering and association rule mining technique," Expert Systems With Applications, Vo. 21, No. 3, Oct. 2001, pp. 131-137.

Li, W.-S., et al., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.

"NCSA httpd" nttpd@ncsa.uiuc.edu.

O'Leary, M., "Web personalization Does It Your Way," O'Leary Online, vol. 23, No. 2, Mar.-Apr. 1999, pp. 79-80.

Ramakrishnan, N., "PIPE: Web Personalization by Partial Evaluation," IEEE Internet Computing, vol. 4, No. 6, Nov.-Dec. 2000, pp. 21-31.

Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.

Sells, Chris et al., "Generating Code at Run Time with Reflection. Emit," Windows Developer Magazine, Aug. 2002, vol. 13, No. 8, pp. 26-34.

Stewart, Tony: "The Document as Application: Issues and Implications" GCA XML Europe 1999; pp. 575-599.

Syme, Don, "ILX: Extending the .NET Commin IL for Functional Language Interoperability," Electronic Notes in Theoretical Computer Science 59 No. 1 (2001), pp. 1-20.

Varela, Carlos A.; Caroline C. Hayes; "Providing Data on the Web: From Examples to Programs," Second International WWW Conference, Chicago, IL; Oct. 17, 1994; 17 pages.

Partial European Search Report for EP 02 00 5786.

Marc Abrams & Constantinos Phanouriou, "UIML: An XML Language for Building Device-Independent User Interfaces," XML Conference Proceedings, Dec. 1999, 15 pgs.

Abrams, M. et al., "UIML: an appliance-independent XML user interface language," Computer Networks, Elsevier Science Publishers B.V., Amsterdam, NL, vol. 31, No. 11-16.

Kaasinen Eija et al., "Two approaches to bringing internet services to WAP devices," Computer Networks and ISDN Systems, North Holland Publishing, Amsterdam, NL, vol. 33, 2o. 1, 2000, pp. 231-246.

"Spyglass Prism 3.1 Supports the Latest Standards for Transmission of Content to Wireless Devices," Internet citation, 'Online! Jul. 5, 2000, XP-002160099, 3 pages.

Marc Abrams et al., "UIML: An XML Language for building Device-Independent User Interfaces," XML Conference Proceedings. Proceedings of XML, Dec. 1999.

Flammia, G., "The Wireless Internet Today and Tomorrow," IEEE Intelligent Systems, [Online] vol. 15, Sep. 2000, pp. 82-83.

Abrams et al., "UIML An appliance-independent XML user interface language," Computer Networls, Elsevier Science Publishes B.V., Amsterdam, NL, vol. 31, No. 11-16, May 17, 1999 pp. 1695-1708.

Kaasinen Eija et al.; "Two approaches to bringing internet services to WAP devices," Computer Networks and ISDN Systems, North Holland Publishing, Amsterdam, NL, vol. 33, No. 1, 2000, pp. 231-246.

"Spyglass Prism 3.1 Supports the latest Standards for Transmission of Content to Wireless Devices," Internet citation, Jul. 5, 1000.

Muller-Wilken S. et al.; "On integrating mobile devices into a workflow management scenario," Database and Expert Systems Applications, 2000. Proceedings 11th International Workshop on Sep. 4-8, 2000, Piscataway, NJ, USA, IEEE, pp. 186-190.

Ciancarini et al., "An extensible rendering engine for XML and HTNL", Computer Networks and ISDN System, North Holland Publishing, vol. 30, No. 1-7, Apr. 1998, pp. 225-237.

Alves Dos Santooa, L.M., "Multimedia Data and tools for Web services over Wireless Platforms," IEEE Personal Communications, Oct. 1998, pp. 42-46.

Krikelis, A., "Mobile multimedia: shapring the Inforverse", IEEE Concurrency, Jan.-Mar. 1999, pp. 7-9.

Kitayama et al., "Design of a Framework for Dynamic Content Adaptation to Web-Enabled Terminals and Enterprise Applications", IBM Research, IEEE, pp. 72-79, Dec. 1999.

"Metadata Activity Statement," Feb. 2001, W3C.

"Metadata Activity Statement," http://web.archive.org/web20000616163950/http://www.w4.org/Metadata/Activity.html, May 8, 2000, pp.1-5.

"Web Services Desciption Language (WSDL)," Mar. 2001, W3C.

Aggarwal, Charu et al., "Caching on the World Wide Web," IEEE Transactions on Knowledge and Data Engineering, vol. 11, No. 1, Jan./Feb. 1999, pp. 94-107.

Ballinger, "Fun with SOAP Extensions," Mar. 2001. MSDN, pp. 1-5.

Heins et al., "Taking Your Information Into the Wireless World: Developing Information for Delivery to Mobile Devices," IEEE, pp. 237-244. Oct. 2001.

Howard, "Web Services with ASP.NET," Feb. 2001, MSDN, pp. 1-9.

Kagal et al., "Centaurus: A Framework for Intelligent Services in a Mobile Environment," Computer Science and Electrical Engineering, IEEE, pp. 195- 201, Apr. 2001.

Kirda, "Web Engineering Device Independent Web Services," Distributed Systems Group, IEEE, pp. 795-796, May 2001.

Moore, M. M. et al., " Migrating legacy user interfaces to the internet shiting dialogue initiative," IEEE, Nov. 23, 2000, pp. 52-58.

Plart, "Thunderclap, the Newsletter of Rolling Thunder Computing," dated to Aug. 2001, vol. 3, No. 2, pp. 1-18.

Ren, Robin, "Practical Active Server Pages Technique: Porting Windows CGI Applications to ASP," Microsoft Interactive Developer, No. 10, pp. 89-98, ASCII Corporation, Nov. 18, 1998 (CSDB: Technical Journal in Japna 2000001200009).

W3C, SOAP Version 1.2 Specification Jul. 9, 2001 Working Draft, Jul. 2001.

U.S. Appl. No. 09/570071 filed May 12, 2000, Smith et al.
U.S. Appl. No. 09/875324 filed Jun. 06, 2001, Guthrie et al.
U.S. Appl. No. 09/899539 filed Jul. 06, 2001, Ebbo et al.
U.S. Appl. No. 11/158816 filed Jun. 21, 2005, Moore et al.
U.S. Appl. No. 11/184094 filed Jul. 18, 2005, Guthrie et al.

Chapter 1 Introduction-"Java Script Language", Netscape Communications, Apr. 23, 2001.

Kaffe, "Server Side Java", Jan. 16, 1998.

Tuecke, "Microsoft Professional Developers Conference Summary", 1996.

Winer, Dave, "XMP RPC Specification", Jun. 15, 1999.

Davidson, et al., "Schema for Object-Oriented IML 2.0", Jul. 1999, W3 Consortium, pp.1-29.

Office Action dated Nov. 17, 2004 in U.S. Appl. No. 09/999,565.
Office Action dated May 25, 2005 in U.S. Appl. No. 09/999,565.
Office Action dated Feb. 08, 2006in U.S. Appl. No. 09/999,565.
Office Action dated Jul. 25, 2006 in U.S. Appl. No. 09/999,565.
Office Action dated Jan. 13, 2005 in U.S. Appl. No. 09/989,562.
Office Action dated Jul. 27, 2005 in U.S. Appl. No. 09/989,562.
Office Action dated Jul. 19, 2006 in U.S. Appl. No. 09/989,562.
Office Action dated Jan. 30, 2007 in U.S. Appl. No. 09/989,562.
Office Action dated Jul. 06, 2007 in U.S. Appl. No. 09/989,562.
Office Action dated Apr. 28, 2005 in U.S. Appl. No. 10/269,072.
Office Action dated Dec. 09, 2005 in U.S. Appl. No. 10/269,072.
Office Action dated Jun. 14, 2006 in U.S. Appl. No. 10/269,072.
Office Action dated Nov. 30, 2006 in U.S. Appl. No. 10/269,072.
Office Action dated Apr. 19, 2007 in U.S. Appl. No. 10/269,072.

* cited by examiner

Multiple Dispatch Table

|  | Label | Panel | Form | ... |
|---|---|---|---|---|
| WML | ↗ | ↗ | ↗ | |
| HTML | ↗ | ↗ | ↗ | |
| CHTML | ↗ | ↗ | ↗ | |
| Speech Output | ↗ | ↗ | ↗ | |
| Telephony Input | ↗ | ↗ | ↗ | |
| ... | | | | |

*FIG. 5*

```
<mobileControls>         610
    <device name="HtmlDeviceAdapters"
            predicateClass="System.Web.UI.MobileControls.Adapters.HtmlPageAdapter"
601         predicateMethod="DeviceQualifies"
            pageAdapter="System.Web.UI.MobileControls.Adapters.HtmlPageAdapter">

<control name="System.Web.UI.MobileControls.Panel"
                adapter="System.Web.UI.MobileControls.Adapters.HtmlPanelAdapter"/>
        <control name="System.Web.UI.MobileControls.Form"
                adapter="System.Web.UI.MobileControls.Adapters.HtmlFormAdapter"/>
        <control name="System.Web.UI.MobileControls.TextBox"
                adapter="System.Web.UI.MobileControls.Adapters.HtmlTextBoxAdapter"/>
        <control name="System.Web.UI.MobileControls.Label"
                adapter="System.Web.UI.MobileControls.Adapters.HtmlLabelAdapter"/>

</device>
602
    <device name="WmlDeviceAdapters"
       615   predicateClass="System.Web.UI.MobileControls.Adapters.WmlPageAdapter"
             predicateMethod="DeviceQualifies"
       620   pageAdapter="System.Web.UI.MobileControls.Adapters.WmlPageAdapter">

<control name="System.Web.UI.MobileControls.Panel"
                adapter="System.Web.UI.MobileControls.Adapters.WmlPanelAdapter"/>
  625   <control name="System.Web.UI.MobileControls.Form"
                adapter="System.Web.UI.MobileControls.Adapters.WmlFormAdapter"/>
        <control name="System.Web.UI.MobileControls.TextBox"
                adapter="System.Web.UI.MobileControls.Adapters.WmlTextBoxAdapter"/>
        <control name="System.Web.UI.MobileControls.Label"
                adapter="System.Web.UI.MobileControls.Adapters.WmlLabelAdapter"/>

<control name="System.Web.UI.MobileControls.Calendar"
                adapter="System.Web.UI.MobileControls.Adapters.WmlCalendarAdapter"/>
        <control name="System.Web.UI.MobileControls.TextView"
                adapter="System.Web.UI.MobileControls.Adapters.WmlTextViewAdapter"/>

</device>
603
    <device name="CHtmlDeviceAdapters"
            inheritsFrom="HtmlDeviceAdapters"
       605  predicateClass="System.Web.UI.MobileControls.Adapters.CHtmlPageAdapter"
            predicateMethod="DeviceQualifies"
            pageAdapter="System.Web.UI.MobileControls.Adapters.CHtmlPageAdapter">

<control name="System.Web.UI.MobileControls.Form"
                adapter="System.Web.UI.MobileControls.Adapters.CHtmlFormAdapter"/>

</device>

</mobileControls>
```

FIG. 6

METHOD AND SYSTEM FOR INTERACTING WITH DEVICES HAVING DIFFERENT CAPABILITIES

RELATED APPLICATION

This application is a Utility Patent application based on a previously filed U.S. Provisional Patent application, U.S. Ser. No. 60/276,394 filed on Mar. 16, 2001, the benefit of the filing date of which is hereby claimed under 35 U.S.C. § 119(e).

FIELD OF THE INVENTION

The present invention relates generally to computer-executable software, and more particularly to interacting with devices having different capabilities.

BACKGROUND

With the increasing number and variety of consumer electronics, it is becoming more difficult to write computer applications that can interact with each device without being modified to account for variations between the capabilities of devices. For example, a cell phone may display a list of menu options by placing each option and a number on each display line. Placing a number next to each option facilitates the selection of an option as a cell phone typically includes a numeric keypad. A POCKET PC, on the other hand, usually uses a stylus for inputting user choices and data. The menu options displayed on a POCKET PC may therefore be optimized for selection by a stylus and not include numbers as such a device typically does not have a keypad.

Furthermore, a cell phone display may have a relatively small area in which to display information. As a consequence, menus displayed on a cell phone may be unable to fit on one display screen. Thus, to display a longer menu on a cell phone may require scrolling through information. Conversely, a POCKET PC may have a relatively large area in which to display information. The same menu that required multiple pages for the cell phone to display may only require one page for the POCKET PC to display.

Two different devices may have widely disparate ways of presenting a menu and receiving user input. One device may display the menu using text and receive input through a keypad while another device may "display" the menu through audio and receive input through voice commands.

Writing a program that automatically adapts itself for each device with which it interacts places an undue burden on a programmer. One approach to solving this problem uses an extensible style sheet language (XSL). XSL may be used to transform one extensible markup language (XML) schema to another XML schema. By transforming one schema to another, XSL may be used to translate the commands a program generates for displaying information on a device into commands the display device requires.

Using XSL, however, has several disadvantages. One disadvantage is the number of style sheets required. A new application typically requires one or more new XML schemas specific to that application. Each new XML schema requires at least one new XSL style sheet for each device supported. Thus, to add one application that could be translated to N devices would require N times the number of XML schemas specific to the application. Furthermore, when a new device is created, to provide universal support from all existing applications, new style sheets for each application would be required. This causes a large up-front cost of creating such documents and a lingering cost of maintaining the documents as device features are updated or change.

Another disadvantage of using style sheets is that XSL is not well-suited for two-way interaction with a device. That is, while XSL might be used to translate a particular form onto the display of a device, other mechanisms would be required (and one or more additional style sheets) to translate responses from the device back into information the application could utilize.

Yet another disadvantage of using style sheets relates to maintaining state information regarding a display operation. In the cell phone example above in which a menu requires multiple pages and scrolling to be displayed, XSL is ill-suited for maintaining state information about which page the cell phone is currently on and which page should be sent next to the cell phone.

Thus, there is a need in the art of a method and system for interacting with devices having different capabilities.

SUMMARY

The present invention provides a method and system for interacting with devices having different capabilities. The invention provides intelligent server-side objects (hereinafter referred to as adapters) that translate information and commands to and from various formats depending on the requirements and capabilities of the target device. An interface may be used with the adapters to create interactive forms such that a software developer is able to create a form without knowing the exact details or features of the device upon which the form will be displayed. This allows future use of the form on devices that may not presently have adapters. Additionally, adapters provide a mechanism for developers providing support for new devices to relatively quickly integrate and make compatible with existing server applications new or existing devices.

BRIEF DESCRIPTION OF THE DRAWINGS

FIG. 5 shows a multiple dispatch table that may be used by an adapter selector to select an appropriate adapter;

FIG. 6 shows an extensible document that may be used to define adapters and relationships between adapters;

DETAILED DESCRIPTION

The present invention provides a method and system for interacting with devices having different capabilities. Among other things, disclosed is a system which uses device capabilities to select an appropriate adapter set for interacting with the device. First, an illustrative computing device and operating environment will be described. Then, components used for selecting an adapter will be discussed. Finally, methods for using the computing device and components to select appropriate adapters will be disclosed.

Illustrative Computing Device

Figure 1:
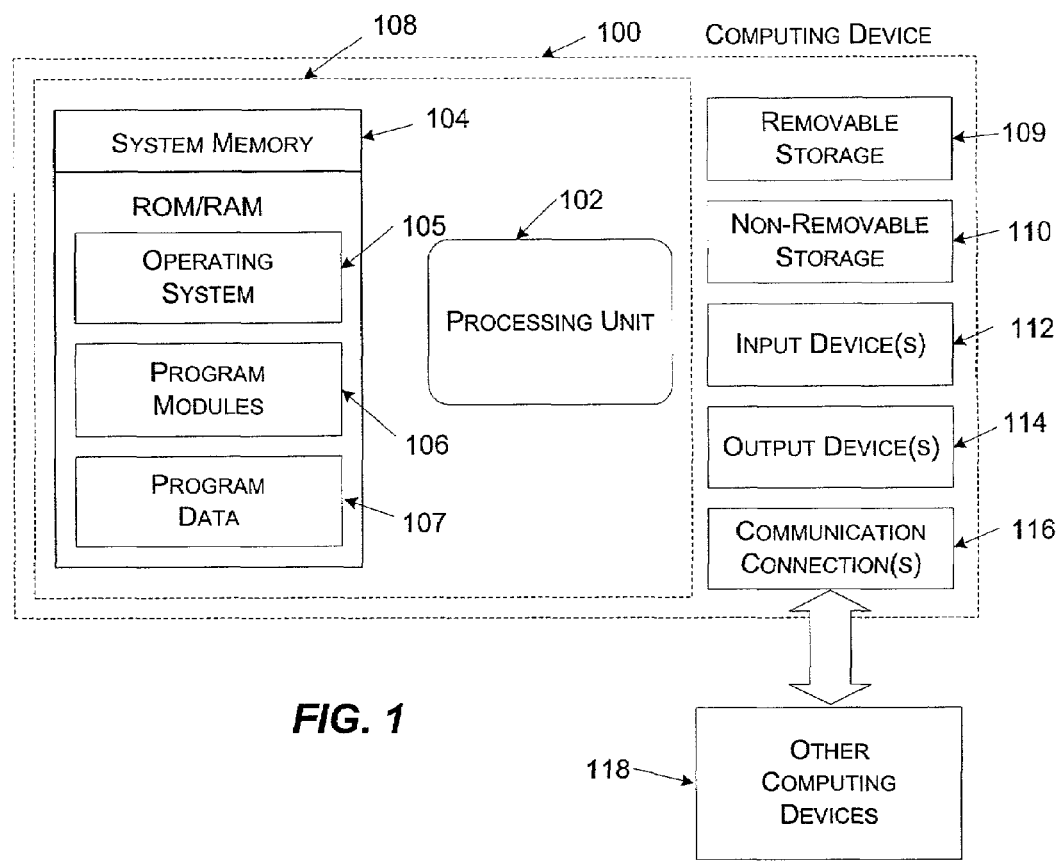
FIG. 1 shows an exemplary computing device that may be included in a system implementing the invention.

FIG. 1 shows an exemplary computing device that may be included in a system implementing the invention, according to one embodiment of the invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), nonvolatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Operating Environment

Figure 2:
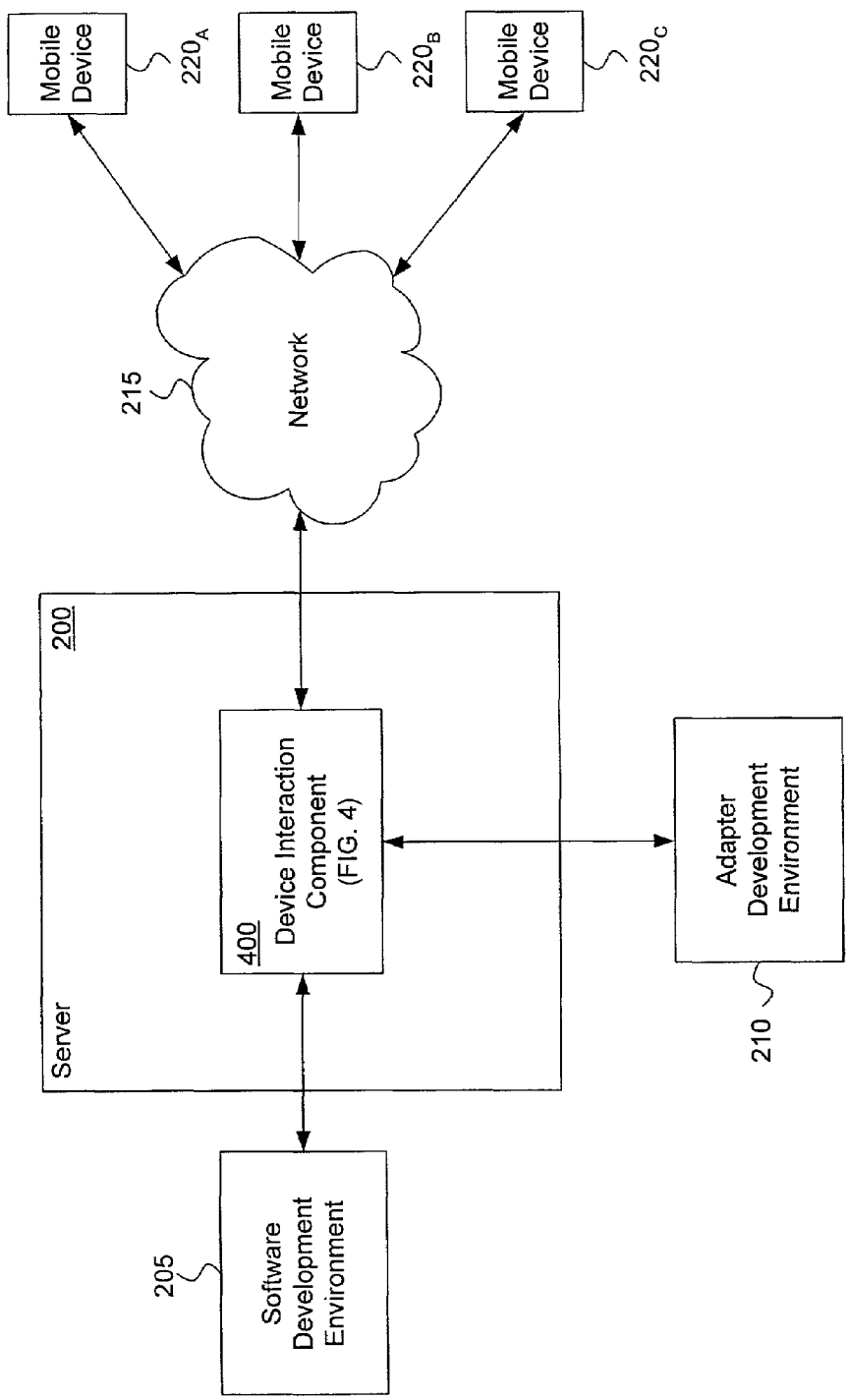
FIG. 2 shows a functional block diagram illustrating an exemplary environment for practicing the invention.

FIG. 2 shows a functional block diagram illustrating an exemplary environment for practicing the invention, according to one embodiment of the invention. The environment includes server 200, software development environment 205, adapter development environment 210, network 215, and mobile devices $220_{a-c}$. Server 200 includes device interaction component 400 which is described in more detail in conjunction with FIG. 4.

Software development environment 205 provides a software developer access for developing applications for server 200. Software development environment 205 may be as simple as a text editor used with a file transport protocol (FTP) application for transmitting and receiving programs from server 200, or it may include a suite of software development tools such as one or more compilers, debuggers, source code control applications, team development tools, and the like. One such suite of software development tools is Microsoft VISUAL STUDIO® produced by Microsoft Corporation of Redmond, Washington. Such software development tools typically make the software applications easier to develop, debug, and maintain, as is understood by those of ordinary skill in the art.

Software development typically involves creating pages, forms, controls, and other server objects (hereinafter sometimes collectively referred to as server objects) for displaying information to and receiving input from users. A server application program may include many such server objects. Typically, the server application program is arranged in terms of pages, i.e. information that should be displayed to a user together. A page may include links to other pages, forms, controls, and other server objects. A form may be used, for example, for collecting address information. The form may display address fields, prompt a user for address and name information, validate inputted information, and send the information to the server application program for further storage and use.

A form may have controls on it to facilitate user input. For example, a form may have a radio button control for receiving a user's selection. A form may have a free text control for receiving textual input from the user. A form may have control buttons such as OK or CANCEL to receive confirmation or cancellation from a user. A control, however, is not limited to being placed within a form; it may also be placed within a page, another control, or another server object.

Adapter development environment 210 provides an adapter developer access to creating adapters for device interaction component 400. In one embodiment, adapter development environment 210 may be a software development environment similar to software development environment 205. In fact, adapter development environment 210 may be included in software development environment 205. Furthermore, adapter development environment 210 may be distinguishable from software development environment 205 only by the fact that the software developer is writing an adapter rather than other software. In another embodiment, adapter development environment 210 may be a specialized development environment for use in creating adapters. For example, it may have unique menu options, emulation tools, or features that are particularly suited for creating adapters.

Figure 4:
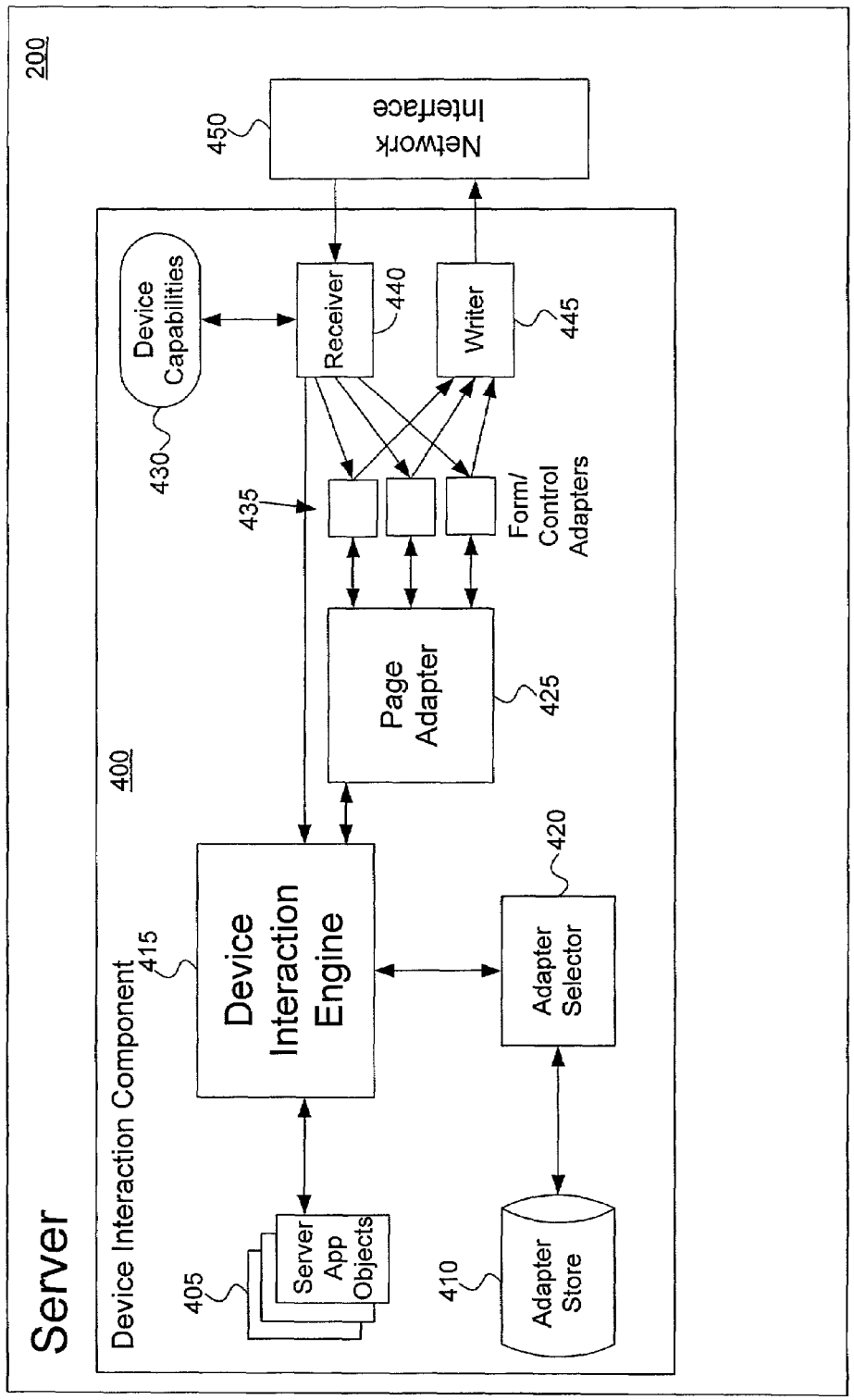
FIG. 4 shows a functional block diagram of server components transforming information from server objects using adapters and receiving input.

Adapters are described in more detail in conjunction with FIG. 4. Briefly, an adapter's functions include 1) transforming information from server objects into information displayed on an electronic device, such as mobile devices $220_{a-c}$; and 2) transforming responses from such electronic devices into information usable by an application program running on the server. For example, an adapter may transform a menu control created using software development environment 205 into a multi-page menu displayed on mobile device $220_a$ or into a single page menu displayed on mobile device $220_b$. The adapter may then transform a menu selection entered by a user into data for use by the application program.

Mobile devices $220_{a-c}$ include such things as cell phones, pagers, POCKET PCs, hand-held electronic devices, programmable and non-programmable consumer electronics, personal computers, and the like. Such devices typically range widely in terms of capabilities and features. For example, a cell phone may have a numeric keypad and a few lines of monochrome LCD display on which only text may be displayed. A POCKET PC may have a touch sensitive screen, a stylus, and several lines of color LCD display in which both text and graphics may be displayed. A computer may have a keyboard, mouse, speakers, microphone, and a relatively large area on which to display forms.

Network 215 connects device interaction component 400 with mobile devices $220_{a-c}$. Network 215 includes wireless and non-wireless networks and networks including a combination of wireless and non-wireless networks. Network 215 may include local area networks (LANs), such as a corporate networking system, wide area networks, such as the Internet, cellular and/or pager networks, a direct network connection between computers, such as through a universal serial bus (USB) connection, combinations thereof, and the like. In essence, network 215 includes any communication method by which information may travel from any of mobile devices $220_{a-c}$ to device interaction component 400.

Server 200 is an example of a computing device, such as computing device 100 as described in conjunction with FIG. 1. Server 200 includes device interaction component 400 which is described in more detail in conjunction with FIG. 4. Server 200 may also include other application programs and components and may be used for a variety of purposes related or unrelated to the present invention. Server 200 stores, retrieves, and executes applications and/or objects created using software development environment 205. Server 200 stores and retrieves adapters created by adapter development environment 210.

Device interaction component 400 executes on server 200 and utilizes server objects created by software development environment 205 and adapters created by adapter development environment 210. Device interaction component 400 is described in more detail in conjunction with FIG. 4. Briefly, device interaction component 400 selects appropriate adapters to transform pages, forms, controls, and the like into information suitable for viewing on and receiving user response from mobile devices $220_{a-c}$. Device interaction component 400 shields a software developer from the capability intricacies of each mobile device by providing a common interface for use in software development. The interface may allow the developer, for example, to specify that a menu be displayed on a device and that a menu selection be returned. With this interface, the software developer may not need to be concerned with the size of the display or the input capabilities of the user's device as device interaction component 400 transforms the menu in a manner appropriate to the device the user is using. Note, however, that the interface may also provide direct access to the device's capabilities. This allows a software developer to customize interactions with a device if desired.

Figure 3:
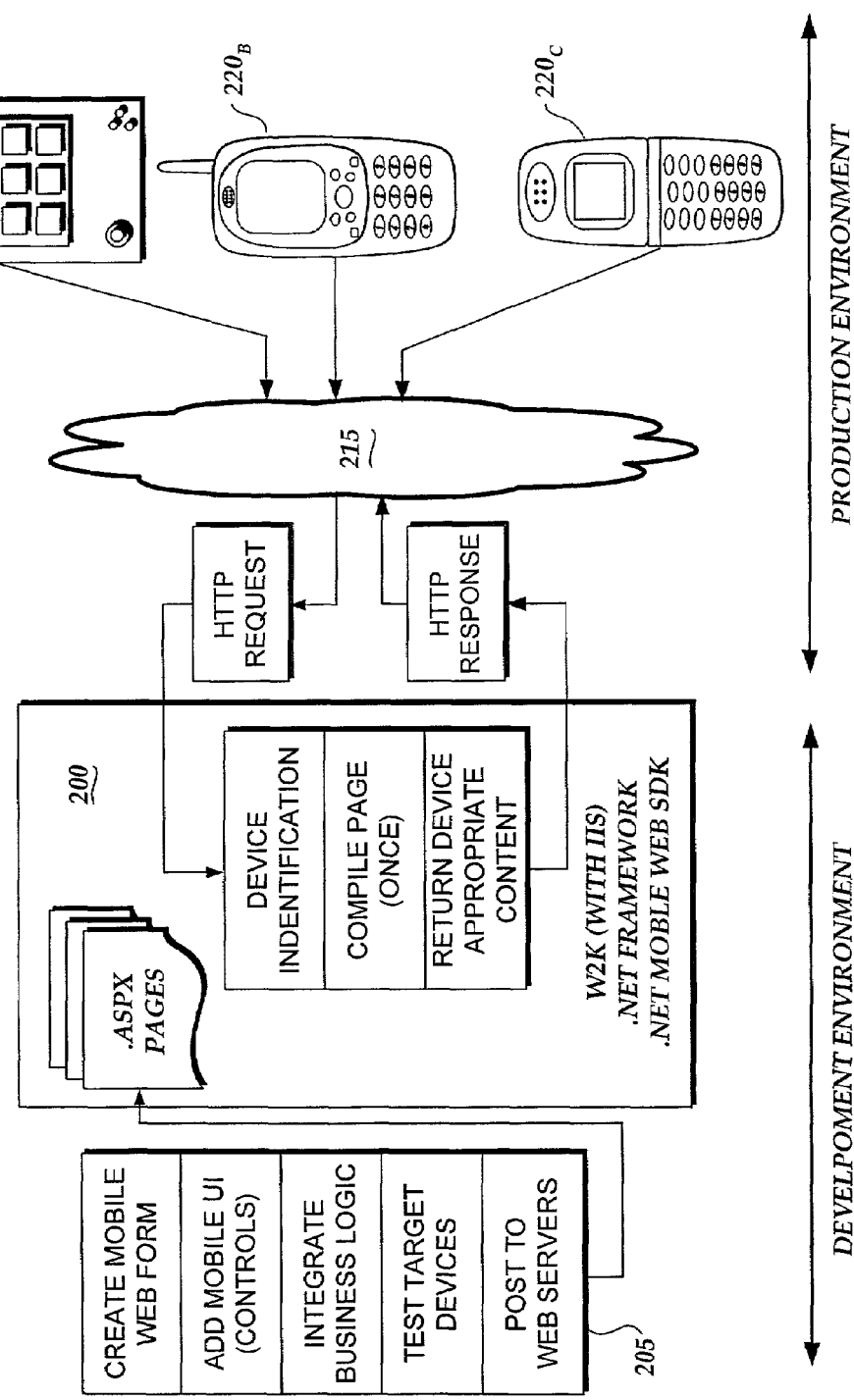
FIG. 3 shows a functional block diagram illustrating an exemplary environment for practicing the invention with another view of some of the components shown in FIG. 2.

FIG. 3 shows a functional block diagram illustrating an exemplary environment for practicing the invention with another view of some of the components shown in FIG. 2, according to one embodiment of the invention. FIG. 3 elaborates on steps a software developer may engage in when creating server objects using software development environment 205. Additionally, FIG. 3 shows steps device interaction component 400 may execute to display content on mobile devices $220_{a-c}$. FIG. 3 also includes a line indicating an environment in which the server pages, objects, forms, and controls may be developed (development environment) and a line indicating an environment in which the server objects may be utilized to interact with mobile devices $220_{a-c}$ (production environment).

FIG. 4 shows a functional block diagram of server components transforming information from server objects using adapters and receiving input, according to one embodiment of the invention. Server 200 includes device interaction component 400 and network interface 450. Device interaction component 400 includes server application objects 405, adapter store 410, device interaction engine 415, adapter selector 420, page adapter 425, device capabilities component 430, form/control adapters 435, receiver 440, and writer 445.

Server application objects 405 store server objects created for a software application. Typically, server objects are not constructed for use on only one device; rather, a developer typically creates the server objects by programming to a specified programming interface. As previously mentioned, the interface abstracts device capabilities such that the developer does not need to know (but can still access if desired) the exact capabilities of the device in order to create an object to display on the device. Instead, the developer may create an object which calls a feature-rich programming interface and relies on adapters (discussed below) to transform such calls in device-specific ways.

Adapter store 410 may store adapters, information as to where adapters may be found, other information about adapters, or any combination thereof. Typically, adapters are arranged in adapter sets. That is, the adapters associated with a particular device or set of devices are grouped (at least logically) in an adapter set. For example, a set of devices may communicate using a wireless markup language (WML). A set of adapters may be logically grouped to handle conversion to and from WML. One adapter may be used to transform a server menu control to display menus and receive user selections from a device. Another adapter may be used to transform a server free-text question control to display a question and retrieve free-form text from the same device. Another adapter may be used to translate a server radio button control into a format suitable for display on the device and to receive a user's selection. Another adapter may be used to transform a server spreadsheet control to display and receive spreadsheet type data on a device.

Adapters may transform forms such that from a device's perspective (or a user using the device), it is difficult or impossible to determine the exact format of the server object containing the form. For example, a server menu form transformed by an adapter and displayed on a cell phone may list items and numbers next to the items for user input. A radio button control transformed by an adapter and displayed on the cell phone may also list items and numbers next to the items for user input. This may occur because the cell phone lacks a radio button interface. Rather than preclude a software developer from using a radio button form, an adapter may be created that transforms a radio button server object into what appears to the user to be a menu form.

An adapter may inherit attributes and methods from another adapter in the same or another adapter set. An adapter set may inherit adapter associations, i.e., which server objects should be mapped to which adapters, from another adapter set. Methods and attributes of ancestor adapters may be extended, restricted, or over-written. Generally, object-oriented rules apply to the relationships and interactions between related adapters. This model makes it easier to create an adapter set for a new but similar device. For example, one device may accept hypertext markup language (HTML) documents. A new device may accept compact hypertext markup language (CHTML) documents. Causing a CHTML adapter set to inherit from an already-existing HTML adapter set may eliminate a significant amount of work in creating the CHTML adapter set.

Adapter selector 420 receives device capabilities and a server object, e.g. a form, page, or control, from device interaction engine 415 and selects an adapter for transforming the server object. A device may not match with an adapter set. That is, an adapter may not exist in any adapter set for transforming the server object to the device. In that case, a default adapter set may be used, an error may be generated, or other processing may take place. For example, adapter selector 420 may indicate to device interaction engine 415 that no adapter set matches the device capabilities. Typically, adapter selector 420 sends device interaction engine 415 the selected adapter, a reference to it, or an error. Adapter selector 420 may also be used to determine which adapter set should be used to map server objects to a device. Selection of adapters is discussed in more detail in conjunction with FIGS. 5-8.

Receiver 440 receives requests, responses, and/or information from network interface 450. In one embodiment, such requests, responses, and/or information are sent directly to receiver 440. In another embodiment, such requests, responses, and/or information are sent to device interaction component 415 and relayed to form/control adapters 435. Typically, when a communication is a response to a previous communication sent by form/control adapters 435, the response is relayed to form/control adapters 435 for further processing. For example, if a device is responding to a menu selection sent by an adapter, the response may be relayed to form/control adapters 435 for further processing. When a communication is a request for access to a server object, receiver 440 may request device capabilities from device capabilities component 430 and send these capabilities together with the communication to device interaction engine 415.

In another embodiment of the invention, when the communication is a request, the communication may be sent directly to device interaction engine 415 which then requests device capabilities from device capabilities component 430. In such embodiments, device capabilities component 430 may be directly connected to or under control of device interaction engine 415 in addition to, or in lieu of, being connected to or under control of receiver 440.

Device capabilities component 430 determines what capabilities a device has. Different devices may have different capabilities as discussed in conjunction with FIG. 2. Device capabilities component 430 may include a database of "known" devices or it may query a device on-the-fly for capabilities. Device capabilities component 430 may determine that the device capabilities are unknown. In such a case, device capabilities component 430 may send a default set of capabilities, an error, or some other message so indicating.

Writer 445 sends information to network interface 450 directed at one or more devices. Although form/control adapters 435 are shown directly connecting to writer 445, writer 445 may receive information from any adapters including page adapter 425, form/control adapters 435, and/or any other adapters. In one embodiment of the invention, writer 445 may be implemented as an object having certain methods, helper functions, and attributes. Writer 445 may be passed to each adapter performing a transformation. Each adapter performing a transformation uses writer 445 to insert information into a response to be sent to a device.

Page adapter 425 may be instantiated by device interaction engine 415 or by an executing server object spawned by device interaction engine 415. As the server object executes, it may request that a page be rendered or that information be requested from a user using a device. Upon request (through invocation of one of page adapter 425's methods), page adapter 425 begins rendering a "page" of information to deliver to the device together with any controls necessary to process the server object's request.

In one embodiment of the invention, once a server object from server application objects 405 begins execution and page adapter 425 is instantiated, page adapter 425 may cease communicating with device interaction engine 415. Instead, it may receive commands from and deliver information to the associated executing server object. In other words, device interaction engine 415 may instantiate page adapter 425, execute an appropriate server object from server application objects 405, associate the instantiated page adapter 425 with the executing server object, and "step out of the way" as the executing server object and adapter interact with each other to send information to and receive information from a device. Device interaction engine 415 may then be available to service a request from another device by executing another instance of the same or a different server object, instantiating another page adapter, and associating the server object with the new page adapter.

In another embodiment of the invention, device interaction engine 415 may be more involved. It may perform tasks such as instantiating page adapter 425, executing an appropriate server object from server application objects 405, associating the instantiated page adapter with the executing server object, instantiating and associating one or more form control adapters 435 as needed, relaying requests and/or information between the instantiated adapter(s) and associated executing server object(s), and relaying messages from receiver 440 to adapters(s) and/or server objects as appropriate. In this embodiment of the invention, device interaction engine 415 may receive communications, determine what should be done, and "farm out" work and messages as needed.

In one embodiment of the invention, page adapter 425 may communicate with device interaction engine 415 to determine which form and/or control adapters to instantiate for objects referenced from the server object with which page adapter 425 is associated. In another embodiment of the invention, the associated server object may instantiate the appropriate form and/or control adapters and associate them with page adapter 425 and/or forms and controls referenced within the server object. In yet another embodiment of the invention, device interaction engine 415 uses adapter selector 420 to predetermine which form and/or control adapters may be needed, instantiates such adapters, and associates them with appropriate server objects.

Form/control adapters interact with page adapter 425, receiver 440, and writer 445, and may interact with each other. Form/control adapters 435 may receive information from and transmit information to page adapter 425. For example, upon receiving instructions to render a page, page adapter may send instructions to each form and/or control adapter associated with the page to render its respective form or control. Form/control adapters 435 may receive information from and transmit information to associated server objects executed from server application objects 405. For example, a server object may instruct one or more forms and/or controls to render themselves without causing that all forms and/or controls render themselves. Form/control adapters 435 may receive information from and transmit information to receiver 440 and writer 445. Form/control adapters 435 may receive information from and transmit information to each other as explained below.

Although FIG. 4 shows form/control adapters 435 interacting directly with receiver 440 and writer 445, there may be one or more layers of adapters between form/control adapters 435 and receiver 440 and writer 445. For example, a panel form may include a radio button control and a spreadsheet form. Even if one or more layers of adapters are between form/control adapters 435 and receiver 440 and writer 445, form/control adapters 435 may still communicate directly with receiver 440 and writer 445 and not be limited to communicating requests and information through a sub form or control. On the other hand, forms and controls may communicate with or through each other (even if they are unrelated) to transform information from server objects into information appropriate for receiver 440.

Device interaction engine 415 performs many functions, some of which have been alluded to above. Some of device interaction engine 415's basic functions include receiving a request, selecting and instantiating adapters, and executing appropriate server objects. Device interaction engine 415 may receive a request from receiver 440 indicating that a device is requesting access to one or more server objects contained in server application objects 405. Device interaction engine 415 determines which server object(s) from server application objects 405 should be executed to service the request and executes the determined object(s). Additionally, device interaction engine 415 may employ adapter selector 420 to select appropriate adapter(s) for the server object(s), instantiate the selected adapter(s), and associate the adapter(s) with the server objects(s). Device interaction engine 415 may also be used to communicate requests for adapters to adapter selector 420. For example, an executing server object or an instantiated adapter may request an adapter using device interaction engine 415.

Network interface 450 transmits and receives messages over network 215. Such messages may be transmitted and received using protocols including hypertext transport protocol (HTTP), transmission control protocol/Internet protocol (TCP/IP), ftp, email, direct file transfer, combinations thereof, and the like. In essence any transmission protocol capable for transmitting information over network 215 may be used in conjunction with network interface 450 to send information to and receive information from devices.

Some embodiments of device interaction component 400 and its components have been described above. In light of this disclosure, it will be understood that components and interactions of the components within device interaction component 400 could be changed, added, or removed without departing from the spirit and scope of this invention.

Following is a description of a table that might be stored in adapter store 410 and utilized by adapter selector 420 to select appropriate adapters.

Illustrative Adapter Selection Components

FIG. 5 shows a multiple dispatch table that may be used by an adapter selector, such as adapter selector 420, to select an appropriate adapter, according to one embodiment of the invention. Along the X axis are displayed labels of forms and controls. Along the Y axis are displayed names of adapter sets. Cells formed from intersecting columns and rows may contain references, sometimes referred to as pointers, to an adapter that performs transformation for the adapter set for the column-indicated form or control.

Multiple dispatching allows the selection of the code to execute to be based upon the subtypes of more than one argument whereas single dispatching selects code to execute based on the subtype of one argument. Polymorphism is one example of single dispatching. With polymorphism, one typically defines a class with a virtual method. Then, one defines one or more child classes that inherit from the class. Typically, the child classes will each define a method that is called when the virtual method would have been called. In a classic example, the child classes operate on shapes such as squares or circles. The virtual method is called with the subtype of child class (one argument), which then causes the appropriate code to be executed to draw the shape, e.g., circle drawing or square drawing code, depending on the child's class type.

Double dispatching allows the code selected to be based upon the subtypes of two arguments. For example, the drawing code could be selected based on subtypes of sphere and wire frame to draw a sphere using a wire frame. Double dispatching may also be referred to as multiple dispatching of degree two. Multiple dispatching has several advantages known in the art over single dispatching. While the table shown in FIG. 5 may be used for double dispatching, it might also be extended in multiple dimensions to provide for more degrees of dispatching.

As described earlier in conjunction with FIG. 4, adapter sets may inherit from other adapter sets. For example, the adapter set CHTML may inherit from the adapter set HTML. In addition server objects, e.g., forms, controls, and pages, may inherit from other server objects. For example, a RangeValidator control that insures input is within a given range may inherit from a BaseValidator control.

Figure 7:
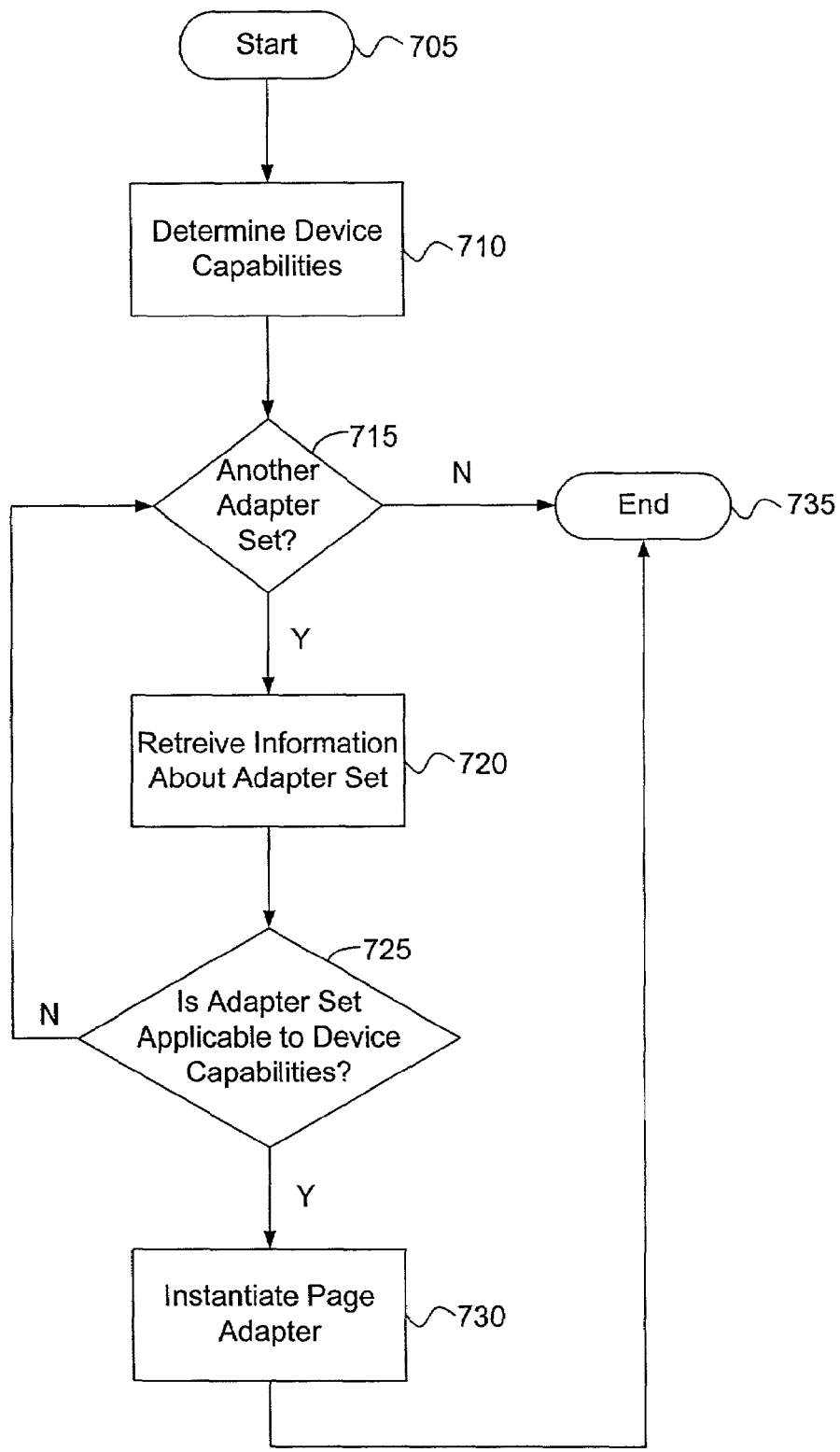
FIG. 7 shows a logical flow diagram illustrating a process for selecting an adapter set suitable for use with a device.
Figure 8:
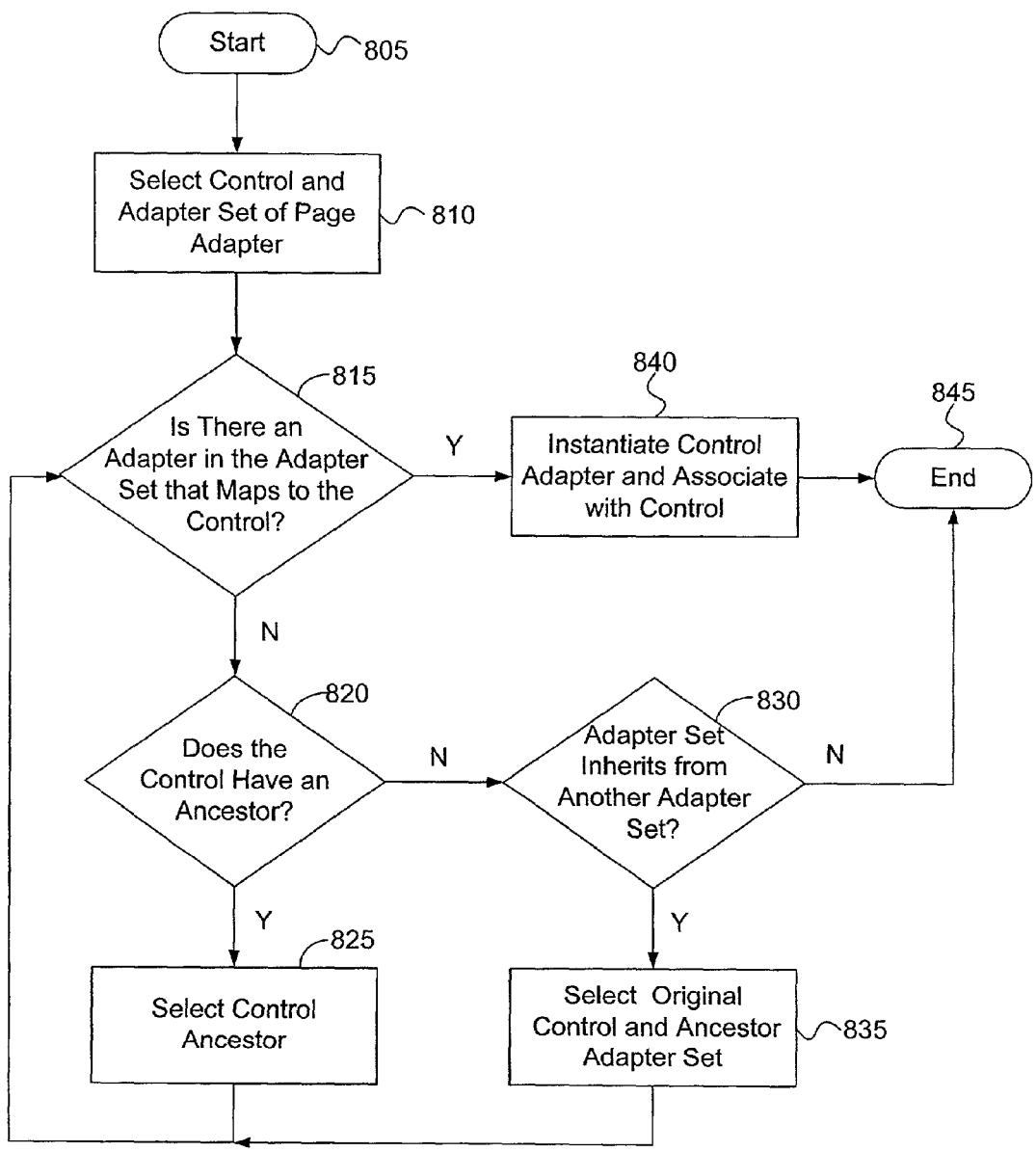
FIG. 8 shows a logical flow diagram illustrating a process for selecting an adapter to use with an object associated with a server object in accordance with the invention.

Selecting an appropriate adapter using multiple dispatching is described in more detail in conjunction with FIG. 7 and 8.

FIG. 6 shows an extensible document that may be used to define adapters and relationships between adapters, according to one embodiment of the invention. In the document, a tag of "device" (601-603) indicates that an adapter set follows. A tag of "inheritsFrom" (605) indicates that an adapter set inherits from another adapter set (610). The tags "predicateClass" (615) and "predicateMethod" (620) may be used to select an appropriate adapter set for a particular device. For example, the combination of these two tags may reference a function that receives information about the requesting device, e.g., the device's capabilities, and makes a determination as to whether an adapter set is suitable to working with the device. The tag "control" (625) may be used to associate a control with an adapter.

It will be recognized that the document shown in FIG. 6 may be readily translated into a table similar to that shown in FIG. 5. In other words, the document could be used to provide a textual interface for multiple dispatching. In light of this disclosure, it will also be recognized that the document may be readily modified to provide for adapters for new devices. For example, to add a new device supporting voice input, a vendor could create an appropriate adapter set. Then, the vendor could edit the document shown in FIG. 6 and insert a new <device> . . . </device>section to cause the adapter set to be used in the double dispatching mechanism described in conjunction with FIGS. 5, 7, and 8.

Above have been disclosed an illustrative computing device, an illustrative operating environment, details of a device interaction component, and an exemplary table used in selecting adapters and adapter sets (through multiple dispatching). In addition an exemplary document has been described which simplifies device addition by specifying relationships between adapters and adapter sets as well as where adapters are implemented. Following are disclosed exemplary methods of selecting an appropriate adapter set, page adapter, and form or control adapter.

Illustrative Adapter Selection Components

FIG. 7 shows a logical flow diagram illustrating a process for selecting an adapter set suitable for use with a device. The process begins at block 705 when a device, such as mobile device $220_a$ of FIG. 2, requests access to a server object, such as a form object in server application objects 405 of device interaction component 400 of FIG. 4.

At block 710, the device capabilities are determined. For example, referring to FIG. 4, receiver 440 requests device capabilities from device capabilities component 430. Then receiver 440 sends the request from mobile device $220_a$ together with the device's capabilities to device interaction engine 415.

At block 715, a loop is entered to determine an adapter set appropriate for interacting with the device. Each time the loop iterates, a determination is made as to whether another adapter set is available for consideration for interacting with the device. If an adapter set is not available, processing branches to block 735. Otherwise, processing branches to block 720. Continuing with the example above, device interaction engine 415 requests that adapter selector 420 determine an appropriate adapter set for mobile device $220_a$. Adapter selector 420 begins searching through adapter sets in adapter store 410, to find an appropriate adapter set.

At block 720, information is retrieved about the adapter set to be considered. Continuing with the example above, adapter selector 420 retrieves an adapter set from adapter store 410. Typically, the set would contain information such as that found in FIG. 6.

At block 725, a determination is made as to whether the adapter set is applicable to the device capabilities. If the adapter set is applicable to the device capabilities, processing branches to block 730; otherwise, processing branches to block 715. Continuing with the example above, adapter selector 420 uses information from the device capabilities, such as, for example, that mobile device $220_a$ communicate using WML, and determines if the adapter set works with WML.

At block 730, the page adapter associated with the adapter set is instantiated. If the process executes block 730, this indicates that a suitable adapter set has been located. Continuing with the example above, adapter selector 420 sends a reference to the WML adapter set to device interaction engine 415. Using the reference, device interaction engine 415 instantiates the page adapter of the WML adapter set, associates the WML adapter set with a server object in server application objects 405, and instantiates and executes the server object.

At block 735, processing ends. At this point, either an adapter set applicable to the device has been located and a page adapter has been instantiated, or an adapter set has not been located that is applicable to the device. In the former case, the server object associated with the page adapter may begin transmitting information to and receiving information from the device using the page adapter and other adapters from the page adapter's adapter set. In the latter case, a default adapter set may be selected and its page adapter instantiated, the device may be sent an error message, or other action may be taken.

FIG. 8 shows a logical flow diagram illustrating a process for selecting an adapter to use with an object associated with a server object. For example, as mentioned earlier, a page may include a control object, such as a radio button control, and while the page may have an associated page adapter, the control object may still need its own adapter. The object associated with the server object will be referred to in this discussion with the phrase "form or control," although the associated object is not limited to these particular objects.

Briefly, the search for a suitable adapter begins after a page adapter has been selected and a form or control adapter is requested. The search for a suitable adapter for the form or control starts by considering the adapter set from which the page adapter was chosen. If when considering this adapter set, there is not a suitable adapter for the form or control, an ancestor of the form or control is considered with the same adapter set. If a suitable adapter is not found for the ancestor of the form or control, another ancestor of the form or control is selected. After all ancestors of the form or control are considered with the adapter set without finding a suitable adapter, an ancestor adapter set of the adapter set is selected. Again, the original form or control is considered in selecting an appropriate adapter in the selected ancestor adapter set. Then, ancestors of the form or control are selected and considered. This process continues until the form or control and its ancestors have been compared against the original adapter set and its ancestors. When a suitable adapter is located, the selection process terminates and the adapter is instantiated and associated with the form or control.

The process begins at block 805 when a mapping of a form or control to a device is requested. For example, referring to FIG. 2, a mobile device, such as mobile device $220_b$, may request access to a server object. In response, device interaction engine 415 of FIG. 4 may instantiate and execute a server object from server application objects 405 and instantiate and associate a page adapter, such as page adapter 425, with the server object. The server object, device interaction engine 415, and/or page adapter 425 may require additional form/control adapters to transform the form or control to a form suitable for the device. For illustrative purposes, assume that the associated object is a radio button control.

At block 810, the form or control and the adapter set of the page adapter previously chosen are selected. Continuing with the example above, a request is sent to adapter selector 420 to find a suitable form/control adapter for use with the form or control. Adapter selector 420 begins by considering the radio button control and the page adapter's adapter set.

At block 815, a search is made for a suitable adapter for the form or control. The search may be made by a table lookup using the name of the form or control. If a suitable adapter is found, processing branches to block 840; otherwise, processing branches to block 820. Continuing with the example above, adapter selector 420 determines if there is a suitable adapter in the adapter set for transforming the radio button control.

At block 820, a determination is made as to whether the form or control has another ancestor that has not been considered with the currently-selected adapter set. If so, processing branches to block 825; otherwise, processing branches to block 830. Continuing with the example above, adapter selector 420 determines whether the radio button control has another ancestor that has not been considered with the currently-selected adapter set.

At block 825, an ancestor of the form or control is selected for further consideration. This ancestor is used in the next iteration of searching for a suitable adapter. Continuing with the example above, adapter selector 420 selects another ancestor of the form or control that has not been considered with the currently-selected adapter set.

At block 830, a determination is made as to whether the adapter set under consideration inherits from another adapter set. Block 830 is reached after all ancestors of the form or control have been exhausted without finding an appropriate adapter for mapping the form or control. If the adapter set inherits from another adapter set, processing branches to block 835; otherwise, processing branches to block 845. Continuing with the example above, adapter selector 420 determines whether the currently considered adapter set inherits from another adapter set.

At block 835, the original form or control is selected together with an adapter set that is an ancestor of the currently-selected adapter set. This ancestor adapter set is used with the next iteration of searching for an appropriate adapter for the form or control. Continuing with the example above, adapter selector 420 selects an ancestor adapter set and the radio button control.

At block 840, a form/control adapter is instantiated and associated with the form or control. Block 840 is reached when an adapter or one of its ancestor classes is suitable to use with the form or control. Although not shown, block 840 may also be reached if no suitable adapter is found and a default adapter is selected. Continuing with the example above, adapter selector 420 sends the selected adapter to device interaction engine 415 (or another requesting device) which then instantiates the adapter (into one of form/control adapters 435) and associates it with other appropriate adapters and/or the appropriate form or control associated with the server object for which mapping was sought.

At block 845, the process ends. At this point an appropriate or default adapter has been found and instantiated or no adapter has been found which maps to the form or control. When an adapter has been found, the adapter has been associated with other adapters (as appropriate) and with the form or control in the server object for which mapping was sought.

In one embodiment of the invention, when an appropriate adapter has been found for the form or control and no entry exists in a look up table used to find the adapter, an entry is placed in the table. This speeds future requests to find the appropriate adapter for the particular form or control.

In some embodiments of the invention, selecting ancestor classes of a form or control proceeds in a linear fashion. That is, first the immediate ancestor of the form or control is selected, for example the form or control's parent. Then, the next most immediate ancestor of the form or control is selected, for example, the form's grandparent, etc. In other embodiments of the invention, selecting ancestor classes of a form or control proceeds in other fashions. For example, the most distant ancestor, e.g. a base class, may be selected first, etc. Likewise, in some embodiments of the invention, selecting ancestor adapter sets of an adapter set proceeds in a linear fashion. In other embodiments of the invention, selecting ancestor adapter sets proceeds in other fashions.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for selecting an adapter to transform information sent from a server object to a device and information sent from the device to the server object, comprising:

determining a capability of the device;

retrieving information about an adapter set based on the capability;

using the information to determine if the adapter set is applicable to the capability, wherein using the information step, comprises:

selecting each adapter in the adapter set;

determining if the selected adapter maps to a control identified by the information;

indicating that the adapter set is applicable if the selected adapter maps to the control;

if the selected adapter does not map to the control, determining if an ancestor of the selected adapter maps to the control;

indicating that the adapter set is applicable if an ancestor of the selected adapter maps to the control;

if an ancestor of the selected adapter does not map to the control, indicating that the adapter set is not applicable; and in response to an indication that the adapter set is applicable, selecting the adapter set, wherein the adapter is selected from the adapter set.

2. The method of claim 1, wherein determining the capability of the device includes querying the device.

3. The method of claim 1, wherein determining the capability of the device includes looking up the capability in a database.

4. The method of claim 1, wherein using the information to determine whether the adapter set is applicable, further comprises:

for each adapter set that is an ancestor of the adapter set, performing steps, comprising:

selecting each adapter in the ancestor adapter set;

determining if the selected adapter in the ancestor adapter set or any of its ancestors map to the control;

if the selected adapter in the ancestor adapter set or any of its ancestors map to the control, indicating that the ancestor adapter set is applicable.

5. The method of claim 1, wherein retrieving information is performed by double dispatching.

6. A computer program product stored on a computer storage medium comprising instructions executed by a computer for transforming data sent from a server to a device and for transforming data sent from the device to the server, the instructions comprising:
determining a capability of the device;
retrieving information about an adapter set;
using the information to determine if the adapter set is applicable to the capability wherein using the information step, comprises:
selecting each adapter in the adapter set;
determining if the selected adapter maps to a control identified by the information;
indicating that the adapter set is applicable if the selected adapter maps to the control;
if the selected adapter does not map to the control, determining if an ancestor of the selected adapter maps to the control;
indicating that the adapter set is applicable if an ancestor of the selected adapter maps to the control;
if an ancestor of the selected adapter does not map to the control, indicating that the adapter set is not applicable; and
in response to an indication that the adapter set is applicable, selecting the adapter set and using it to transform the data.

7. The computer program product of claim 6, wherein the device transmits its capability.

8. The computer program product of claim 6, wherein the capability is included in a database.

9. The computer program product of claim 6, wherein an adapter set is applicable when an adapter within the adapter set, an ancestor adapter set of the adapter set, or one of the adapters in the ancestor adapter set maps to the control.

10. The computer program product of claim 6, wherein determining whether the adapter set is applicable includes performing double dispatching.

11. A system for transforming data sent from a server to a device and for transforming data sent from the device to the server, comprising:
a device capabilities component that determines capabilities of the device;
a receiving component that receives data sent from the device and directs it to an adapter;
a sending component that receives data from the adapter and sends it to the device;
an adapter selector component that determines whether an adapter set is applicable to a capability of a device, wherein the adapter selector component performs the steps of:
selecting each adapter in an adapter set;
determining if the selected adapter maps to a control;
indicating that the adapter set is applicable if the selected adapter maps to the control;
if the selected adapter does not map to the control, determining if an ancestor of the selected adapter maps to the control;
indicating that the adapter set is applicable if an ancestor of the selected adapter maps to the control;
if an ancestor of the selected adapter does not map to the control, indicating that the adapter set is not applicable; and
a device interaction component coupled to the device capabilities component, the receiving component, the adapter selector component and the sending component, wherein the device interaction component coordinates communication between the device and an application executing on the server.

12. The system of claim 11, wherein the device capabilities component determines the capabilities of the device by querying the device.

13. The system of claim 11, wherein the device capabilities component determines the capabilities of the device by using a database.

14. The system of claim 11, wherein the adapter is selected from an adapter set that is applicable to the device as determined by the adapter selector component.

15. The system of claim 14, wherein the adapter is selected using double dispatching.

16. A system for transforming data sent between a device and a server, comprising:
means for determining a capability of the device;
means for receiving data sent from the device and directing the data to an adapter;
means for sending data received from the adapter to the device;
means for determining whether an adapter set is applicable to the capability of the device, wherein the means for determining performs the steps of:
selecting each adapter in an adapter set;
determining if the selected adapter maps to a control;
indicating that the adapter set is applicable if the selected adapter maps to the control;
if the selected adapter does not map to the control, determining if an ancestor of the selected adapter maps to the control;
indicating that the adapter set is applicable if an ancestor of the selected adapter maps to the control;
if an ancestor of the selected adapter does not map to the control, indicating that the adapter set is not applicable; and
means for coordinating communication between the device and an application executing on the server, the means for coordinating being coupled to the means for determining a capability, the means for receiving, the means for sending, and the means for determining whether an adapter set is applicable.

17. The system of claim 16, wherein the means for determining a capability determines the capabilities of the device by querying the device.

18. The system of claim 16, wherein the means for determining a capability determines the capabilities of the device by using a database.

19. The system of claim 16, wherein the adapter is selected from an adapter set that is applicable to the device as determined by the means for determining whether an adapter set is applicable.

20. The system of claim 19, wherein the adapter is selected using double dispatching.

* * * * *